United States Patent
Grüner et al.

(10) Patent No.: US 12,479,999 B2
(45) Date of Patent: Nov. 25, 2025

(54) WEATHER STABLE PEARLESCENT PIGMENTS

(71) Applicant: Eckart GmbH, Hartenstein (DE)

(72) Inventors: Michael Grüner, Auerbach (DE);
Günter Kaupp, Neuhaus/Pegnitz (DE);
Thomas Schneider, Lauf (DE)

(73) Assignee: ECKART GmbH, Hartenstein (DE)

( * ) Notice: Subject to any disclaimer, the term of this patent is extended or adjusted under 35 U.S.C. 154(b) by 0 days.

(21) Appl. No.: 19/101,363

(22) PCT Filed: Dec. 7, 2023

(86) PCT No.: PCT/EP2023/084651
§ 371 (c)(1),
(2) Date: Feb. 5, 2025

(87) PCT Pub. No.: WO2024/132544
PCT Pub. Date: Jun. 27, 2024

(65) Prior Publication Data
US 2025/0257219 A1    Aug. 14, 2025

(30) Foreign Application Priority Data
Dec. 22, 2022   (EP) .................................... 22215993

(51) Int. Cl.
*C09C 1/00*   (2006.01)

(52) U.S. Cl.
CPC ...... *C09C 1/0027* (2013.01); *C09C 2200/102* (2013.01); *C09C 2200/401* (2013.01); *C09C 2200/407* (2013.01); *C09C 2220/10* (2013.01)

(58) Field of Classification Search
CPC ............ C09C 1/0027; C09C 2200/102; C09C 2200/401; C09C 2200/407;
(Continued)

(56) References Cited

U.S. PATENT DOCUMENTS

| | | |
|---|---|---|
| 4,544,415 A | 10/1985 | Franz et al. |
| 5,017,207 A | 5/1991 | Watkinson et al. |

(Continued)

FOREIGN PATENT DOCUMENTS

| | | |
|---|---|---|
| EP | 0141174 | 5/1985 |
| EP | 0289240 | 11/1988 |

(Continued)

OTHER PUBLICATIONS

International Search Report and Written Opinion for PCT/EP2023/084651.

*Primary Examiner* — Pegah Parvini (57) ABSTRACT

Weather stable pearlescent pigment having a basic pearlescent with an interference color which comprises a transparent platelet-shaped substrate and at least one metal oxide layer with a refractive index >1.8 and on top of this basic pearlescent pigment a weather stabilizing top coating comprising at least one metal oxide and an organofunctional surface modification, wherein a) for a basic pearlescent pigment with silvery interference color the weather stabilizing top coating consists of a first metal oxide of a rare earth metal M1 from the group consisting of Y, La, Pr, Nd, Sm, Eu, Gd, Tb, Dy, Ho, Er, Tm, Yb, Lu and mixtures thereof, or b) for a basic pearlescent pigment with a colored interference color or a silvery interference color the weather stabilizing top coating comprises a first metal oxide of a rare earth metal M1 from the group consisting of Y, La, Pr, Nd, Sm, Eu, Gd, Tb, Dy, Ho, Er, Tm, Yb, Lu and mixtures thereof, and a second metal oxide from a second metal M2 from the group consisting of Si, Al, Zn, Mg, Zr, Sn and mixtures or combinations thereof, and in each case a) or b) the organofunctional surface modification comprises organofunctional silanes or water-based pre-condensated organofunctional silanes.

13 Claims, 1 Drawing Sheet

(58) Field of Classification Search
CPC . C09C 2220/10; C09C 1/0084; C09C 1/0015; C09C 1/3607
See application file for complete search history.

(56) References Cited

U.S. PATENT DOCUMENTS

| | | |
|---|---|---|
| 5,223,034 A | 6/1993 | Nitta et al. |
| 5,423,912 A | 6/1995 | Sullivan et al. |
| 5,472,491 A | 12/1995 | Duschek et al. |
| 6,176,918 B1 | 1/2001 | Glausch et al. |
| 11,453,789 B2 | 9/2022 | Schoen et al. |
| 2006/0042509 A1 | 3/2006 | Henglein et al. |
| 2008/0190141 A1 | 8/2008 | Watkinson et al. |
| 2010/0116169 A1 | 5/2010 | Kaupp et al. |
| 2010/0297045 A1 | 11/2010 | Kaupp et al. |
| 2011/0118384 A1 | 5/2011 | Bugnon et al. |
| 2014/0018439 A1 | 1/2014 | Gruner et al. |
| 2015/0259563 A1 | 9/2015 | Ibanez et al. |
| 2017/0348202 A1 | 12/2017 | Gruner et al. |
| 2017/0349756 A1 | 12/2017 | Gruner et al. |
| 2017/0355855 A1 | 12/2017 | Gruner et al. |
| 2019/0169439 A1 | 6/2019 | Schoen et al. |
| 2020/0009023 A1 | 1/2020 | Gruner et al. |

FOREIGN PATENT DOCUMENTS

| | | | | |
|---|---|---|---|---|
| EP | 0649886 | 4/1995 | | |
| EP | 1203795 | 5/2002 | | |
| EP | 1682622 | 8/2007 | | |
| EP | 1980594 | 6/2009 | | |
| EP | 2 145 927 | * | 1/2010 | ........... C09C 1/0021 |
| WO | 2016097421 | 6/2016 | | |

* cited by examiner

WEATHER STABLE PEARLESCENT PIGMENTS

The present invention relates to weather stable pearlescent pigments having no gloss-loss in strengthened tests of weather stability and no substantial color alteration due to their top-coating.

Pearlescent pigments which comprise titanium dioxide in the top layer or which are constructed from particulate $TiO_2$ possess a certain photocatalytic activity. If then, UV light acts on a pearlescent pigment in the presence of water and oxygen, the UV activity of the pearlescent pigment may trigger accelerated degradation of organic compounds: a binder matrix, for example. Even the UV fraction present in daylight may cause this reaction, i.e., for applications such as automotive finishes, which are exposed directly to weathering, it is necessary to use pearlescent pigments which have been specially stabilized. In order to counter this effect, which is deleterious for exterior application, pearlescent pigments can be furnished with a variety of protective coatings in order to reduce the photoactivity.

EP 0 141 174 describes pearlescent pigments of improved weathering stability which have a protective coating composed essentially of a rare earth metal compound, which is specified as cerium-oxide—and a polysiloxane. Furthermore, the protective coating application of which takes place in an aqueous suspension may also include zinc salts and/or aluminum salts or else silicate. The polysiloxane is coated together with the silicate or alumina coating.

EP 0 342 533 discloses zirconium oxide-coated pigments to which it is possible to apply a layer composed of a hydrated metal oxide of cobalt, manganese or cerium. The pigment thus treated is then said to be highly suitable for use in nonaqueous coating systems; for water-thinnable coating materials, however, it continues to be unsuitable, in accordance with EP 632 109, since it causes the formation of micro-blisters in the coating film.

According to the teaching of EP 0 632 109 a three-layer protective layer is applied to a platelet-shaped substrate coated with metal oxides. In a 1st stage $SiO_2$ is applied, in a 2nd stage a hydroxide or oxide hydrate of cerium, aluminum or zirconium is applied, and in a 3rd stage at least one hydroxide or oxide hydrate of cerium, aluminum or zirconium and also an organic coupling reagent are applied. Furthermore, the coupling reagents must be hydrolyzed prior to binding to the pigment surface; according to the teaching of EP 0 888 410 B1, only a maximum of 60% of the added coupling reagents can be bound to the pigment surface.

EP 0 888 410 B1 discloses modified pearlescent pigments based on a platelet-shaped substrate coated with metal oxides. According to the teaching of EP 0 888 410 B1 the top layer is composed of at least two oxides, oxide mixtures or mixed oxides of silica, alumina, cerium oxide, titanium oxide or zirconium oxide, and a water-based oligomeric silane system.

EP 0 649 886 provides pearlescent pigments with a titanium dioxide or iron oxide coating which are after coated in aqueous phase with a combination of cerium and aluminum oxide hydrates and are subsequently dried.

US 2011/0118384 A1 discloses weather stable pearlescent pigments having a protective layer from various metal oxides and further an acrylate copolymer.

According to the teaching of EP 1 203 795 a pearlescent pigment can comprise a layered construction which in a first layer comprises oxide hydrates of silicon or of aluminum and in a subsequent, second layer comprises oxide hydrates of silicon, aluminum, zirconium or cerium, the composition of the 1st layer being different from that of the 2nd layer. The pearlescent pigment further comprises a third layer of at least one organic hydrophobic coupling reagent, said organic hydrophobic coupling reagent not reacting with the binder of, say, a coating system.

EP 1682622 A1 discloses weather stable pearlescent pigments with a top-coating comprising a first layer of ceriumoxide followed by a $SiO_2$-layer and an organic surface modification.

US 2019/0169439 A1 discloses weather stable pearlescent pigments with a protective layer which contains at least one rare earth metal oxide and at least one metal oxide selected from silicon, aluminium or zirconium and mixtures thereof. A particularly mentioned rare earth metal oxide is $Ce_2O_3$ which was used in several examples.

US 2014/4018439 A1 disclosed a weather stable pearlescent pigment, wherein the top coating consists of a cerium oxide as single metal oxide layer followed by an organic functionalization.

US 2015/0259563 A1 disclosed a weather stable pearlescent pigment, wherein in the top coating a metal oxide layer of tin is followed by a cerium oxide layer and finally an organic surface modification of oligomeric silanes.

All weather stable top coatings using cerium oxide are practically limited in the amount of this oxide as it has a yellowish absorption color. Too high amounts may result in an unwanted color alteration of the whole pearlescent pigment.

On the other hand, new customer demands involve a more strengthened testing method for weather stability which is a combination of two well-known methods. First the pearlescent pigments are coated onto KTL-panels in a suitable base coat according to automotive demands using a 1K clear coat. These coatings are first treated for 1000 up to 4000 hours in a Xenon test and immediately afterwards in a condensation water test. This test procedure simulates quite harsh conditions in a quite sensitive coating application system. In many cases it can cause irreversible UV reaction and swelling phenomena, finally causing either undesired color changes or significant degradation of gloss properties in the coating application.

Therefore, it is the object of this invention to provide weather stable pearlescent pigments which pass such strengthened test procedure of weather stability, but are not altered too strongly in their interference color compared to the initial pearlescent pigment without top-coating, and do not undergo significant gloss degradation.

This object can be solved by providing a weather stable pearlescent pigment having a basic pearlescent with an interference color which comprises a transparent plateletshaped substrate and at least one metal oxide layer with a refractive index >1.8 and on top of this basic pearlescent pigment a weather stabilizing top coating comprising at least one metal oxide and an organofunctional surface modification, wherein a) for a basic pearlescent pigment with silvery interference color the weather stabilizing top coating consists of a first metal oxide of a rare earth metal M1 from the group consisting of Y, La, Pr, Nd, Sm, Eu, Gd, Tb, Dy, Ho, Er, Tm, Yb, Lu and mixtures thereof, or b) for a basic pearlescent pigment with a colored interference color or a silvery interference color the weather stabilizing top coating comprises a first metal oxide of a rare earth metal $M^1$ from the group consisting of Y, La, Pr, Nd, Sm, Eu, Gd, Tb, Dy, Ho, Er, Tm, Yb, Lu and mixtures thereof, and a second metal oxide from a second metal $M^2$ from the group consisting of Si, Al, Zn, Mg, Zr, Sn and mixtures or combinations thereof, and in each case a) or b) the organofunctional surface modification comprises organofunctional silanes or water-based pre-condensed organofunctional silanes.

Preferred embodiments of this weather stable pearlescent pigments are further disclosed in claims 2 to 11.

A further object of the present invention is to provide a simple method of manufacturing the weather stable pearlescent pigments.

This object can be solved by providing a method of manufacturing the weather stable pearlescent pigments, comprising the following steps:

i) suspending the basic pearlescent pigments in a solvent, iia) coating the basic pearlescent pigments from step i) in the solvent using a rare earth metal oxide precursor at a predetermined pH1, obtaining a rare earth metal oxide layer, or iib) coating the basic pearlescent pigments from step i) in the solvent by one of the following methods:

iib1): using a rare earth metal oxide precursor at a predetermined pH1 obtaining a layer of rare earth metal oxide and then coating this pearlescent pigment with a precursor of a second metal oxide at a predetermined pH2 obtaining a layer of a second metal oxide or iib2): using a precursor of a second metal oxide at a predetermined pH2 forming a layer of a second metal oxide and then coating this pearlescent pigment with a rare earth metal oxide precursor at a predetermined pH1 obtaining a layer of rare earth metal oxide or iib3): using for the coating a rare earth metal oxide precursor together with a precursor of the second metal oxide at a predetermined pH3, wherein pH3 is equal to or preferably in between pH1 and pH2, iii) coating the pearlescent pigments from step iia) or step iib) in the solvent with organofunctional silanes or water based pre-condensed organofunctional silanes, and iv) separating the coated pearlescent pigments, optional washing with solvent, and drying at a temperature from a range of 80° to 160° C.

A preferred embodiment of this process is disclosed in claim 13.

Basic Pearlescent Pigments:

Natural mica is usually the most thinnest transparent substrate which requires higher amounts of the refractive index metal oxide and particularly of $TiO_2$ leading to higher photoactivity. Therefore, a more resistant top coating is need here. On the other hand, the optical properties of basic pearlescent pigments based on synthetic substrates have optically very high-quality properties. By optically very high-quality properties is meant in particular an excellent gloss and color purity of the pearlescent pigments in an application medium.

Therefore, a perturbation of these optical properties by the top coating is a severe drawback. The transparent platelet-shaped synthetic substrates are preferably selected from synthetic mica platelets, glass platelets, $SiO_2$ platelets, $Al_2O_3$ platelets, synthetic boehmite platelets, BiOCl platelets and mixtures thereof and more preferably selected from synthetic mica platelets, glass platelets, $Al_2O_3$ platelets and mixtures thereof. The platelet-shaped synthetic substrates are particularly preferably selected from the group consisting of glass platelets, synthetic mica platelets and mixtures thereof.

The above-named synthetic substrates are known from a series of patent applications and patents. If, e.g., the platelet-shaped synthetic substrate consists of glass platelets, those produced according to the processes described in EP 0 289 240 A1, WO 2004/056716 A1 and WO 2005/063637 A1 are preferably used within the framework of this invention. The glass platelets which can be used as substrate can, for example, have a composition corresponding to the teaching of EP 1 980 594 B1.

The glass platelets, also called glass flakes, described in these documents are characterized by particularly homogeneous surfaces and thicknesses of the platelets. The thickness of the glass platelets preferably varies with a standard deviation of at most 20%, further preferably of at most 15%, still further preferably of at most 10%. The average thicknesses of the glass platelets lie in a range of from 20 to 2,000 nm, preferably in a range of from 100 to less than 1,000 nm. These glass platelets are preferably those which were produced according to the following process (see EP 0 289 240 B1):

feeding a stream of molten glass in a downwards direction into a rotating cup allowing the glass melt to flow over the edge of the cup such that it is forced into a gap between two plates surrounding the cup, wherein the movement of the material takes place in a radial direction and is effected by a stream of air between the plates such that the radial stream is pushed in the radial direction such that it remains flat and the material, when it solidifies, is broken into flakes.

Optically particularly high-quality pearlescent pigments based on synthetic substrates are also known from EP 2 217 664 B1. It can be learned here that substrates with a narrow size distribution surprisingly make it possible to provide pearlescent pigments with particularly high color purity and high gloss.

In an embodiment of the present invention, the weather stable pearlescent pigments according to the invention have a cumulative frequency distribution of a volume-averaged size distribution function with the values $D_{10}$, $D_{50}$ and $D_{90}$, wherein this cumulative frequency distribution has a span $\Delta D$ in a range of from 0.7-1.4. The span $\Delta D$ is calculated according to formula (I):

$$\Delta D=(D_{90}-D_{10})/D_{50} \qquad (I).$$

According to the invention the span $\Delta D$ is used to characterize the particle size distribution. The smaller the span is, the narrower the particle size distribution is. In particularly preferred embodiments, the weather stable pearlescent pigments according to the invention have a span $\Delta D$ in a range of from 0.75-1.3, further preferably in a range of from 0.8 to 1.2 and still further preferably in a range of from 0.85 to 1.1.

No sufficiently color-pure pearlescent pigments are obtained above a span $\Delta D$ of 1.4. Within the framework of the customary methods, pearlescent pigments below a span of the size distribution of 0.7 can only be produced very laboriously and thus no longer economically.

Pearlescent pigments with the span $\Delta D$ values listed above as preferred have excellent color purities. This is particularly true for pearlescent pigments in which the substrate has an average thickness of from 500 to 2000 nm, further preferably of from 500 to 1200 nm.

Thus these parameters of the size distribution function and preferably of the average thickness of the pearlescent pigment substrate interact in a synergetic way with the weather stable coating according to the invention. In such optically high-quality pearlescent pigments even small optical losses as a result of insufficient stabilization on the one hand or a too thick or otherwise optically distorting weather stable layer (such as for example swelling layers) can have a very distorting effect.

The weather stable pearlescent pigments according to the invention can have any average particle size $D_{50}$. The $D_{50}$ values of the pigments according to the invention preferably lie in a range of from 3 to 80 µm. The pigments according to the invention preferably have a $D_{50}$ value from a range of from 5 to 63 µm, particularly preferably from a range of from 7 to 56 µm and quite particularly preferably from a range of from 9 to 40 µm.

The $D_{10}$ values of the pigments according to the invention preferably lie in a range of from 1 to 25 µm. The pigments according to the invention preferably have a $D_{10}$ value from a range of from 2 to 21 µm, particularly preferably from a range of from 3 to 18 µm and quite particularly preferably from a range of from 4 to 14 µm.

The $D_{90}$ values of the pigments according to the invention preferably lie in a range of from 6 to 250 µm. The pigments according to the invention preferably have a $D_{90}$ value from a range of from 15 to 210 µm.

The $D_{10}$, $D_{50}$ or Doo values of the cumulative frequency distribution of the volume-averaged size distribution function, as obtained by laser diffraction methods, indicates that 10%, 50% or 90%, respectively, of the pigments according to the invention have a diameter which is equal to or smaller than the value indicated in each case. Here, the size distribution curve of the pigments is preferably determined with a device from Malvern (device: MALVERN Mastersizer 2000) according to the manufacturer's instructions. If a Mastersizer 3000 apparatus is used it is recommended to measure with the in-house "Mastersizer 2000" module). The scattered light signals were evaluated according to the Fraunhofer approximation.

The average thickness of the platelet-shaped transparent substrates to be coated preferably lies in a range of from 50 nm to 5000 nm, preferably in a range of from 60 nm to 3000 nm and particularly preferably in a range of from 70 nm to 2000 nm.

In an embodiment of the invention, the average thickness for glass platelets as platelet-shaped substrate to be coated preferably lies in a range of from 750 nm to 1500 nm. Such glass platelets are widely available commercially. Thinner glass platelets offer further advantages. Thinner substrates lead to a smaller total layer thickness of the pigments according to the invention. For glass platelets, the average thickness is in a range of from 100 nm to 700 nm, further preferably in a range of from 150 nm to 600 nm, particularly preferably in a range of from 170 nm to 500 nm and quite particularly preferably in a range of from 200 nm to 400 nm, and they are thus also preferred substrates according to the invention.

In a further embodiment, the average thickness for synthetic mica as platelet-shaped substrate to be coated preferably lies in a range of from 100 nm to 700 nm, further preferably in a range of from 120 nm to 600 nm, particularly preferably in a range of from 140 nm to 500 nm and quite particularly preferably in a range of from 150 nm to 450 nm.

If platelet-shaped transparent substrates below an average thickness of 50 nm are coated with, for example, highly refractive metal oxides, extremely fragile pigments are obtained which can break apart even when incorporated into an application medium which in turn results in a significant reduction in gloss. In addition, the times for coating these thin substrates with, for example, highly refractive metal oxides are very long because of the large specific surface areas, i.e. the surface area per weight unit of pigment, of these platelet-shaped transparent substrates, which gives rise to high production costs. Above an average substrate thickness of 5000 nm, the basic pearlescent pigments can be too thick overall. This can be associated with a poorer specific covering capacity, i.e. covered area per weight unit of pigment according to the invention, and a lower plane-parallel orientation in an application medium. A poorer orientation results in turn in a reduced gloss.

In a preferred embodiment the standard deviation of the thickness of the platelet-shaped transparent substrates is 15% to 100%, particularly preferably 20 to 70% and quite particularly preferably 22 to 40%.

Below a standard deviation of 15%, color-flop effect pigments are obtained. Above a standard deviation of 100%, much thicker pigments are contained in the entire pigment system such that poorer orientation and thus losses in gloss then result. The average thickness is determined using a cured coating film in which the effect pigments are orientated substantially plane-parallel to the base. For this, a cross-section polish of the cured coating film is examined under a scanning electron microscope (SEM), wherein the thickness of at least 100 pearlescent pigments is determined and statistically averaged.

The platelet-shaped transparent substrates used according to the invention can be coated or uncoated platelet-shaped substrates. For example, low refractive layers, for example in the form of $Al_2O_3$ and/or $SiO_2$ can also be applied to the platelet-shaped transparent substrates. However, a highly refractive layer is preferably applied as outermost layer. An extremely thin layer of $SnO_2$, which effects a rutilization of a subsequently applied $TiO_2$ layer, can also be applied to the platelet-shaped transparent substrate. By a rutilization is meant that applied $TiO_2$ is not present in the anatase structure but rather the formation of the rutile structure is induced. The rutile structure can, however, also be effected by applying $SnO_2$ and $TiO_2$ jointly with the result that a separate $SnO_2$ layer is not absolutely necessary for the application of a $TiO_2$ layer with rutile structure. According to a preferred variant of the invention, uncoated platelet-shaped substrates are used.

The platelet-shaped substrates are coated with at least one highly refractive metal oxide layer in order to obtain the usual pearlescent effect based on interference. Within the framework of this invention, by a highly refractive metal oxide layer is meant a layer with a refractive index >1.8, preferably >2.0.

The at least one highly refractive layer preferably contains or consists of metal oxides, metal hydroxides and/or hydrated metal oxides which are selected from the group consisting of $TiO_2$, $Fe_2O_3$, $Fe_3O_4$, $TiFe_2O_5$, $Fe_2Ti_3O_9$, $FeTiO_3$, $ZnO$, $SnO_2$, $CoO$, $Co_3O_4$, $ZrO_2$, $Cr_2O_3$, $VO_2$, $V_2O_3$, $(Sn,Sb)O_2$ and mixtures thereof.

The at least one highly refractive metal oxide layer particularly preferably contains or consists of metal oxides, metal hydroxides and/or hydrated metal oxides which are selected from the group consisting of $TiO_2$, $Fe_2O_3$, $Fe_3O_4$, $TiFe_2O_5$, $Fe_2Ti_3O_9$, $FeTiO_3$ and mixtures thereof.

In some embodiments, the transparent substrate is coated with only one (number: 1) highly refractive metal oxide layer which is preferably selected from the group consisting of $TiO_2$, $Fe_2O_3$, $TiFe_2O_5$, $Fe_2Ti_3O_9$, $FeTiO_3$ and mixtures thereof.

In a quite particularly preferred embodiments, the substrate is coated with only one (number: 1) highly refractive metal oxide layer which consists of $TiO_2$ in the rutile modification. By rutile modification (or rutile $TiO_2$) is meant in the sense of this invention that at least 99 wt.-% of the TiO$_2$ is present as rutile, wherein the indication in wt.-% refers to the total TiO$_2$ content in the respective layer.

In a further, particularly preferred embodiment, the chromophoric, highly refractive coating comprises rutile TiO$_2$, i.e. TiO$_2$ in the rutile modification, in a quantity from a range of from 30 to 80 wt.-%, relative to the total weight of the pearlescent pigment. The particularly intensive interference color shades of the third order typically lie in this range. The proportion of the rutile TiO$_2$ coating further preferably lies in a range of from 40-70 wt.-%, still further preferably in a range of from 45-60 wt.-%, in each case relative to the total weight of the pearlescent pigment.

Such amount proportions of rutile TiO$_2$ correspond, individually depending on the fineness and thus on the specific surface area of the platelet-shaped substrate, to a preferred average thickness of the rutile TiO$_2$ layer from a range of from 80-280 nm. The average thickness of the rutile TiO$_2$ layer particularly preferably lies in a range of from 100 to 270 nm.

At these layer thicknesses, as a rule an interference color of the third order may be obtained. Due to the large layer thickness of the rutile TiO$_2$ layer the pigments have a particularly high photocatalytic activity. Accordingly, an undesired discoloration of a color or coating layer containing TiO$_2$-containing pigments occurs very readily with the action of UV radiation.

In some embodiments the basic pearlescent pigment have a so-called "spacer layer" in between two high-refractive index layers. This spacer layer is rather porous with large cavities und certain connections and has a very low effective refractive index. Such pearlescent pigments are described in EP 3034562 B1, EP 3034563 B1, EP 3034564 B1 and WO 2016/097421 A1.

In this invention basic pearlescent pigments having a "silvery" or a "colored" interference color are distinguished.

For the purposes of this invention basic pearlescent pigments with a "silvery" interference color are basic pearlescent pigments whose chroma values $C^*_{15°}$ are ≤20, preferably ≤18, more preferably ≤15, and very preferably ≤10. The chroma values $C^*_{15°}$ of the basic pearlescent pigments with silvery interference color of the invention are preferably in a range from 1 to ≤20, more preferably in a range from 2 to ≤19, more preferably in a range from 3 to ≤18, and with particular preference in a range from 4 to ≤17.

In case of multilayer pearlescent pigments these effect pigments may, in addition to their silver interference color, when viewed from outside of the specular angle, have a colored appearance. This colored appearance may be induced, depending on the nature of the coating of the platelet-shaped transparent substrate, by the inherent color of the coating material and by its layer thickness. On account of the high luster, any absorption color possibly present will be outshone at the specular angle, and the overall appearance of the multilayer pearlescent pigment of the invention will be presented to the viewer as silver-colored. In other embodiments, the silver interference color may also have a slightly pastel hue at the specular angle, but the observer here perceives a predominantly silver appearance. The chroma values herein are determined from the following applications: a nitrocellulose varnish (Dr. Renger Erco Bronzemischlack 2615e; Morton) containing 6.0% by weight of basic pearlescent pigments, the % by weight figure being based on the total weight of the varnish, is applied, depending on the D$_{50}$ value and pigment opaqueness, in a wet film thickness chosen to provide sufficient hiding power, to BYK-Gardner black/white drawdown charts (Byko-Chart 2851), and subsequently dried at room temperature. Then, using a BYK-MAC (BYK Gardner), colorimetric evaluations are performed on these drawdown charts, with measurement taking place on the black background of the drawdown chart. The incident angle is 45° and the chroma value employed is that at an observation angle of 15°.

Likewise, basic pearlescent pigments with a "colored interference color" are defined under these conditions to have a $C^*_{15°}$>20, preferably >18, more preferably >15, and very preferably >10. These lower limits of the $C^*_{15°}$-values are to be interpreted complementary to the values defining a silver basic pearlescent pigment as disclosed above.

The color alterations of the basic pearlescent pigment by the top coating may affect the interference color. It is, however, much more severe when the mass tone of the basic pearlescent is affected. Therefore, within this invention the change of the mass tone by the top coating are mainly accentuated. Such mass tone changes can be best measured on white underground and the details hereof are specified in the experimental section.

Weather-Stable Top Coating:

In this invention the term "rare earth metal oxide" means despite the oxide also a rare earth metal hydroxide or a hydrated rare earth metal oxide and mixtures thereof. Likewise, the term "second metal oxide" of the top coating or any further metal oxide of the top coating means despite the particulate oxide also a second metal hydroxide or a second metal oxide hydrate and mixtures thereof. The same applies to corresponding specified chemical formulas. For example, a "Sm$_2$O$_3$" would also cover possible hydroxides or oxide hydrates of Sm(III) and mixtures thereof.

The metal oxides of the weather stable top coating may be calcined prior the coating with organic functions. In most cases, however, these coatings are not calcined and therefore, hydroxides and oxide hydrates may exist.

The rare earth metal oxides used for the corresponding metal oxide are selected from the metals Y, La, Pr, Nd, Sm, Eu, Gd, Tb, Dy, Ho, Er, Tm, Yb, Lu and mixtures thereof. Preferably the rare earth metal oxides used for the corresponding metal oxide are selected from the metals La, Pr, Nd, Sm, Eu, Gd, Ho, Yb, and mixtures thereof and more preferably from Pr, Nd, Sm, Eu, Gd, Ho, Yb, and mixtures thereof and most preferably from Nd, Sm, Yb, Eu, Gd and mixtures thereof.

For the rare earth metal oxides it is preferred to use predominantly metal oxides with formal oxidation number of three. Therefore, it is preferred that 50 to 100 atomic-% of the rare earth metal M$^1$ metal oxide are based on a M$^1$(III) oxidation state, and more preferred are 70 to 99 atomic-%, each based on the total amount of M$^1$ ions. In this oxidation state the metal ions can undergo redox reactions with, e.g. by holes created by absorption of UV light by a TiO$_2$ layer of the basic pearlescent pigment:

$$M^1(III) + \text{"+"} \rightarrow M^1(IV)$$

Furthermore, most of the rare earth metal oxides of type M$^1_2$O$_3$ are colorless or only slightly colored, whereas Ce$_2$O$_3$ has a stronger gold yellow color tone. This allows to use by trend higher amounts of M$^1_2$O$_3$ compared to Ce$_2$O$_3$ amounts (here with respect to the moles of M$^1_2$O$_3$ used) without reaching strong color changes compared to the respective basic pearlescent pigment.

Therefore, the amount of the first metal oxide of a rare earth metal M$^1$ is preferably in a range of 0.3 to 4.0 wt. %, more preferably in a range of 0.5 to 3.0 wt. %, and most preferably in a range of 0.7 to 2.5 wt. %, each based on the total weight of the pearlescent pigment.

The particulate amount depends strongly on the fineness and thickness of the basic pearlescent pigments more fine and more thin basic pearlescent pigments will have higher specific surfaces and may be optimized by the skilled person without undue burden. Within these ranges a sufficient resistance against the more strengthened testing method of weather stability is achieved on one side and additionally the alterations of interference color by the top coating are acceptable.

The amounts of the rare earth metal can be preferably determined with XRF (X-ray fluorescence analysis) and may be expressed as wt. % of $M^1_2O_3$, referred to the total pearlescent pigment.

In some embodiments the weather stabilizing top coating further comprises a cerium metal oxide in very limited amounts. The amount of cerium-oxide is preferably in a range of 0.0 to 30 wt %, and more preferably in a range of 0.0 to 20 wt. %, each calculated as $Ce_2O_3$ and referred to the total amount of rare earth metal oxide in the weather stable top coating and calculated as $M^1_2O_3$. Such small amounts may be tolerable with respect to the color alterations compared to the basic pearlescent pigments.

For silvery basic pearlescent pigments, it is usually sufficient to utilize just the rare metal oxide coating as single metal oxide coating in the top layer. Usually, such pigments have a rather low thickness of the high-refractive index metal oxide of the basic pearlescent pigment. For example, a transparent silver pearlescent pigment based on a $TiO_2$ coating of a platelet transparent substrate has a thickness of about 40 nm of the $TiO_2$-layer. The photoactivity is not that high here and a single rare earth coating may suffice.

In case of basic pearlescent pigments with a colored interference color the thicknesses and therefore also the amounts of high-reflective metal oxides and particularly of Ti-oxides are higher which usually leads to an increase of the photoactivity. For these cases at least two metal oxide layers are proposed (variant b)). The first rare earth metal oxide layer than is complemented by a second metal oxide coating. This second metal oxide metal is of metal $M^2$ which is selected from Si, Al, Zn, Mg, Zr, Sn and mixtures or combinations thereof.

Particularly preferred second metal oxides are $SiO_2$, $Al_2O_3$, ZnO, MgO, $ZrO_2$, $SnO_2$ and mixtures or combinations thereof.

These materials are already known in the art to be utilized as weather stable top coating materials. They can be used as a mixture of two or more of them or as two or more separate layers. More preferred are $SiO_2$, $Al_2O_3$, ZnO, $ZrO_2$ and mixtures or combinations thereof and most preferred are $SiO_2$, ZnO and mixtures or combinations thereof. In particular, the combination of $SiO_2$ and ZnO, precipitated onto the pearlescent pigment either as subsequent layers or as mixed layers turned out to be particularly effective.

These metal oxides are all transparent in the visible wavelength range and therefore have a very small impact on the mass tone of the pearlescent pigment.

Preferably, the amount of the second metal oxide of a metal $M^2$ is in a range of 1.0 to 5.0 wt. %, and more preferably in a range of 2.0 to 3.5 wt. %, each based on the total weight of the pearlescent pigment.

Regarding the sequence of the first and the second metal oxide every sequence can be principally employed.

In a first preferred embodiment the weather stabilizing top coating b) has a structure characterized that a first coating located on the basic pearlescent pigment is the first rare earth metal oxide coating which is followed by the second metal oxide coating.

As these coatings have a thickness in the nm range the particular sequence might be hard to analyze. Therefore, in a preferred embodiment the weather stabilizing top coating b) has a structure resulting from a first precipitation of a precursor of the first rare earth metal oxide followed by a second precipitation of a precursor material of the second metal oxide.

In a further preferred embodiment the weather stabilizing top coating b) has a structure characterized that the first rare earth metal oxide and the second metal oxide have been manufactured by co-precipitation of both metal oxide precursors. By utilizing such co-precipitation the relative amounts of the distinct metal oxides in the top coating may vary slightly depending on the relative precipitation kinetics of the two precursor materials and the particulate coating conditions. However, essentially a mixed layer of the two metal oxides will evolve.

In a third embodiment the weather stabilizing top coating b) has a structure characterized that a first coating located on the basic pearlescent pigment is the coating of the second metal oxide followed by a coating of the first rare earth metal oxide.

In either variant the weather stable top coating is finished by applying an organic modification. Such modification is well known in the art and is intended to compatibilize the pearlescent pigments surface to the organic binder of the final application in a coating of the pearlescent pigments.

As such coupling agents organofunctional silanes or water-based pre-condensed organofunctional silanes. These coupling agents have been proven to be very efficient and are well known in the art. Such particulate organofunctional silanes have been described in EP 1682622 A1, EP 632109 A1, for example. Pre-condensed organofunctional silanes have been described in detail in EP 0888410 B1 and US 2014/0018439 A1.

Method of Manufacturing the Weather Stable Pearlescent Pigment:

A further object of the present invention is solved by providing a method of manufacturing the weather stable pearlescent pigments, comprising the following steps:
  i) suspending the basic pearlescent pigments in a solvent,
  iia) coating the basic pearlescent pigments from step i) in in the solvent using a rare earth metal oxide precursor at a predetermined pH1, obtaining a rare earth metal oxide layer, or
  iib) coating the basic pearlescent pigments from step i) in the solvent by one of the following methods:
    iib1): using a rare earth metal oxide precursor at a predetermined pH1 obtaining a layer of rare earth metal oxide and then coating this pearlescent pigment with a precursor of the second metal oxide at a predetermined pH2 obtaining a second metal oxide or
    iib2): using a precursor of the second metal oxide at a predetermined pH2 forming a second metal oxide and then coating this pearlescent pigment with a rare earth metal oxide precursor at a predetermined pH1 obtaining a layer of rare earth metal oxide or
    iib3): using for the coating a rare earth metal oxide precursor together with a precursor of the second metal oxide at a predetermined pH3, wherein pH3 is equal to or preferably in between pH1 and pH2,
  iii) coating the pearlescent pigments from step iia) or step iib) in the solvent with organofunctional silanes or water based pre-condensed organofunctional silanes, and iv) separating the coated pearlescent pigments, optional washing with solvent, and drying at a temperature from a range of 80° to 160° C.

The basic pearlescent pigments can be produced according to known methods and many products are commercially available.

The solvent can be water or an organic solvent. Preferred organic solvents are alcohols like methanol, ethanol, n-propanol, isopropanol, n-butanol, 2-methylpropanol, 2-methoxypropanol, butyl glycol, etc. Also possible are mixtures of these alcohols in any desired proportions. Preferred alcoholic solvents are ethanol, isopropanol or mixtures thereof.

Water is preferred as solvent and in this case the precursor materials for the rare earth metal oxide is a suitable water dissolvable salt of preferably $M^1$ cations, which are typically chlorides, nitrates, sulfates, acetates and the like. The pH values are stabilized by dosing appropriate amounts of bases like NaOH or KOH or acids like HCl or $HNO_3$.

For the second metal oxide coating preferably water-glass for $SiO_2$ and chlorides or nitrates of Al, Zn, Zr, Mg or Sn are used.

The $M^1$ cations are preferably 50 to 100 mol. % $M^1$(III) cations and more preferably 80 to 100% $M^1$(III) cations, each based on the total amount of $M^1$ cations. They may be mixed with appropriate amounts of $M^1$(IV) cations. Generally, $M^1$(IV) cations are less preferred as these cations often have distinct colors.

When the solvent is an alcoholic solvent the precursor materials for the rare earth metal oxide are again corresponding salts of preferably $M^1$ cations (e.g. chlorides, nitrates, acetates, octoates, acetyl-acetonates) having sufficient solubility in the solvent. Water is frequently added here to hydrolyze the metallic cations.

Regarding precursors of the second metal oxide typically silanes like tetra methoxysilane or tetra ethoxysilane are used for forming $SiO_2$ and for other metals of $M^2$ salts like chlorides, nitrates or acetonates are typically used.

Catalysts used for alcoholic solvents are preferably nitrogen-containing bases. Examples thereof include ammonia, hydrazine, methylamine, ethylamine, triethanolamine, dimethylamine, diethylamine, methylethylamine, trimethylamine, triethylamine, ethylenediamine, trimethylenediamine, tetramethylenediamine, 1-propylamine, 2-propylamine, 1-butylamine, 2-butylamine, 1-propylmethylamine, 2-propylmethylamine, 1-butylmethylamine, 2-butylmethylamine, 1-propylethylamine, 2-propylethylamine, 1-butylethylamine, 2-butylethylamine, piperazine, and pyridine.

The pH1 values for precipitating the rare earth metal oxide precursors is preferably in a range of 4.5 to 9.0 and more preferably in a range of 5.0 to 8.5. The pH2 values for precipitating the second metal oxide precursors is preferably in a range of 5.0 to 9.0.

The temperature for the coating reactions is preferably in a range of 50° C. to the boiling point of the solvent used, more preferably in a range of 55° C. to 80° C.

The drying step step vi) can be done at ambient pressure or under vacuum.

A further object of this invention is solved by the use of the weather stable pearlescent pigments in coatings, printing inks, plastics, powder coatings and particularly in automotive base coatings.

A further embodiment of this invention are formulations comprising the weather stable pearlescent pigments and particularly automotive base coat formulations.

A EXAMPLES

Example 1

100 g of commercially available silvery pearlescent pigment based on synthetic mica of fineness 10-40 µm (Symic C604, Eckart GmbH) was suspended in 900 g of water. Subsequently, the dispersion was heated to 70° C. and at a pH of 5.2 a solution consisting of 1.90 g $EuCl_3*H_2O$ dissolved in 50 mL water was added. At the same time, the pH value was kept constant by adding a 10% KOH solution. Thereafter, the pH value was raised with 5 wt. % KOH solution to 7.5 and stirred for 15 min.

A water glass solution (51.4 g water glass solution, 3.0 wt. % $SiO_2$ (theoretical value referred to initial pearlescent pigment), mixed with 20.7 g of demineralized water) was then slowly introduced into the suspension where the pH value was kept constant at pH 7.5.

After the solution was completely added, the suspension was stirred for 1 h before adding a solution of 7.1 g of Hydrosil 2627 diluted with 24.3 g of demineralized water. After additional stirring for 180 minutes, suspension was filtered off and the filter cake was washed with demineralized water before drying at 95° C. under 100 mbar vacuum.

Example 2

100 g of commercially available silvery pearlescent pigment based synthetic mica of fineness 10-40 µm (Symic C604, Eckart GmbH) was suspended in 900 g of water. Subsequently, the dispersion was heated to 70° C. and at a pH of 6.7 a solution consisting of 2.61 g $PrCl_3*6H_2O$ dissolved in 42 mL water was added. At the same time, the pH value was kept constant by adding a 10% KOH solution. Thereafter, the pH value was raised with 5 wt. % KOH solution to 7.5 and stirred for 15 min.

A water glass solution (51.4 g water glass solution, 3.0 wt. % $SiO_2$ (theoretical value referred to initial pearlescent pigment), mixed with 20.7 g of demineralized water) was then slowly introduced into the suspension where the pH value was kept constant at pH 7.5.

After the solution was completely added, the suspension was stirred for 1 h before adding a solution of 2.1 g of Dynasilan 1189 diluted with 14.7 g of isopropyl alcohol. After additional stirring for 180 minutes, suspension was filtered off and the filter cake was washed with demineralized water before drying at 75° C. under 100 mbar vacuum.

Example 3

100 g of commercially available silvery pearlescent pigment based synthetic mica of fineness 10-40 µm (Symic C604, Eckart GmbH) was suspended in 900 g of water. Subsequently, the dispersion was heated to 70° C. and at a pH of 8.5 a solution consisting of 3.06 g $Sm(NO_3)_3*6H_2O$ dissolved in 67 mL water was added. At the same time, the pH value was kept constant by adding a 10% KOH solution. Thereafter, a water glass solution (51.4 g water glass solution, 3.0 wt. % $SiO_2$, mixed with 20.7 g of demineralized water) was then slowly introduced into the suspension where the pH value was kept constant at pH 8.5.

After the solution was completely added, the suspension was stirred for 1 h before adding a solution of 1.9 g of Dynasilan 6490 diluted with 14.7 g of isopropyl alcohol. After additional stirring for 180 minutes, suspension was filtered off and the filter cake was washed with demineralized water before drying at 75° C. under 100 mbar vacuum.

Example 4

100 g of commercially available silvery pearlescent pigment based on synthetic mica of fineness 10-40 μm (Symic C604, Eckart GmbH) was suspended in 900 g of water. Subsequently, the dispersion was heated to 70° C. and at a pH of 5.5 a solution consisting of 2.99 g $Gd(NO_3)_3*6H_2O$ dissolved in 65 mL water was added. At the same time, the pH value was kept constant by adding a 10% KOH solution. Thereafter, the pH value was raised with 5 wt.-% KOH solution to 7.5 and stirred for 15 min.

A water glass solution (51.4 g water glass solution, 3.0 wt. % $SiO_2$, mixed with 20.7 g of demineralized water) was then slowly introduced into the suspension where the pH value was kept constant at pH 7.5.

After the solution was completely added, the suspension was stirred for 1 h before adding a solution of 5.7 g of Hydrosil 2776 diluted with 24.3 g of demineralized water. After additional stirring for 180 minutes, suspension was filtered off and the filter cake was washed with demineralized water before drying at 95° C. under 100 mbar vacuum.

Example 5

100 g of commercially available silvery pearlescent pigment based on synthetic mica of fineness 10-40 μm (Symic C604, Eckart GmbH) was suspended in 900 g of water. Subsequently, the dispersion was heated to 70° C. and at a pH of 6.7 a solution consisting of 2.37 g $YbCl_3*6H_2O$ dissolved in 65 mL water was added. At the same time, the pH value was kept constant by adding a 10% KOH solution. Thereafter, the pH value was raised with 5 wt. % KOH solution to 7.5 and stirred for 15 min.

A water glass solution (51.4 g water glass solution, 3.0 wt. % $SiO_2$, mixed with 20.7 g of demineralized water) was then slowly introduced into the suspension where the pH value was kept constant at pH 7.5.

After the solution was completely added, the suspension was stirred for 1 h before adding a solution of 7.1 g of Hydrosil 2627 diluted with 24.3 g of demineralized water. After additional stirring for 180 minutes, suspension was filtered off and the filter cake was washed with demineralized water.

Example 6

150 g of commercially available silvery pearlescent pigment based on synthetic mica of fineness 10-40 μm (Symic C604, Eckart GmbH) was suspended in 1200 g of water. Subsequently, the dispersion was heated to 70° C. and at a pH of 6.5 a solution consisting of 2.87 g $NdCl_3*H_2O$ dissolved in 60 mL Water was added. At the same time, the pH value was kept constant by adding a 10% KOH solution. Thereafter, the pH value was raised with 5 wt. % KOH solution to 7.5 and stirred for 15 min.

A water glass solution (77.1 g water glass solution, 3.0 wt. % $SiO_2$, mixed with 31.0 g of demineralized water) was then slowly introduced into the suspension where the pH value was kept constant at pH 7.5.

After the solution was completely added, the suspension was stirred for 1 h before adding a solution of 9.65 g of Hydrosil 2627 diluted with 36.5 g of demineralized water. After additional stirring for 180 minutes, suspension was filtered off and the filter cake was washed with demineralized water before drying at 95° C. under 100 mbar vacuum.

Example 7 (Alcoholic Route)

100 g of commercially available silvery pearlescent pigment based on synthetic mica of fineness 10-40 μm (Symic C604, Eckart GmbH) was suspended in 500 ml of isopropanol and brought to boiling temperature.

Under gentle mixing, first 2.0 g $H_2O$ afterwards within an hour a solution of 3.96 g $EuCl_3*H_2O$ in 20 g isopropyl alcohol was added. Subsequently, a mixture of 0.45 g ethylenediamine and 3.0 g $H_2O$ was added. Thereafter, 8.9 g of tetraethoxysilane and 21.0 g of isopropyl alcohol were continuously introduced over a period of 2 h by use of a dosing pump. The suspension was then allowed to react for another 6 hours. Then add a solution of 2.1 g Dynasilan 1189 in 12.9 g isopropyl alcohol and stop heating. The mixture was stirred over night at room temperature and filtered and washed before drying at 95° C. under 100 mbar vacuum.

Example 8

100 g of commercially available silvery pearlescent pigment based on synthetic mica of fineness 10-40 μm (Symic C604, Eckart GmbH) was suspended in 900 g of water. Subsequently, the dispersion was heated to 70° C. and at a pH of 5.5 a solution consisting of 5.6 g $Gd(NO_3)_3*6H_2O$ dissolved in 75 ml water was added. At the same time, the pH value was kept constant by adding a 10% KOH solution. Thereafter, the pH value was raised with 5 wt. % KOH solution to 7.5 and stirred for 15 min.

A water glass solution (42.8 g water glass solution, 2.5 wt. % $SiO_2$, mixed with 13.8 g of demineralized water) was then slowly introduced into the suspension where the pH value was kept constant at pH 7.5.

After the solution was completely added, the suspension was stirred for 1 h before adding a solution of 5.7 g of Hydrosil 2776 diluted with 24.3 g of demineralized water. After additional stirring for 180 minutes, suspension was filtered off and the filter cake was washed with demineralized water before drying at 95° C. under 100 mbar vacuum.

Example 9

100 g of commercially available silvery pearlescent pigment based synthetic mica of fineness 10-50 μm (Symic C604, Eckart GmbH) was suspended in 900 g of water. Subsequently, the dispersion was heated to 70° C. and at a pH of 5.5 a solution consisting of 2.4 g $EuCl_3*H_2O$ dissolved in 75 mL Water was added. At the same time, the pH value was kept constant by adding a 10% KOH solution. Thereafter, the pH value was raised with 5 wt. % KOH solution to 7.5 and stirred for 15 min.

A water glass solution (42.8 g water glass solution, 6.0 wt. % $SiO_2$, mixed with 13.8 g of demineralized water) was then slowly introduced into the suspension where the pH value kept constant at pH 7.5.

After the solution was completely added, the suspension was stirred for 1 h before adding a solution of 2.0 g of Dynasilan 4148 diluted with 24.3 g of demineralized water. After additional stirring for 180 minutes, suspension was filtered off and the filter cake was washed with demineralized water before drying at 95° C. under 100 mbar vacuum.

Example 10

100 g of commercially available silvery pearlescent pigment based on synthetic mica of fineness 10-50 μm (Symic C604, Eckart GmbH) was suspended in 900 g of water. Subsequently, the dispersion was heated to 70° C. and at a pH of 5.5 a solution consisting of 4.0 g $EuCl_3*H_2O$ dissolved in 75 mL Water was added. At the same time, the pH value was kept constant by adding a 10% KOH solution. Thereafter, the pH value was raised with 5 wt. % KOH solution to 7.5 and stirred for 15 min.

A water glass solution (42.8 g water glass solution, 6.0 wt. % $SiO_2$, mixed with 13.8 g of demineralized water) was then slowly introduced into the suspension where the pH value was kept constant at pH 7.5.

After the solution was completely added, the suspension was stirred for 1 h before adding a solution of 5.7 g of Hydrosil 2776 diluted with 24.3 g of demineralized water. After additional stirring for 180 minutes, the suspension was filtered off and the filter cake was washed with demineralized water before drying at 95° C. under 100 mbar vacuum.

Example 11

100 g of commercially available red pearlescent pigment based on titanium dioxide coated glass flakes of fineness 10-60 μm (Luxan C241, Eckart GmbH) was suspended in 800 g of water. Subsequently, the dispersion was heated to 70° C. and at a pH of 8.5 a solution consisting of 3.06 g $Sm(NO_3)_3*6H_2O$ dissolved in 67 mL Water was added. At the same time, the pH value was kept constant by adding a 10% KOH solution. Thereafter, a water glass solution (51.4 g water glass solution, 6.0 wt. % $SiO_2$, mixed with 20.7 g of demineralized water) was then slowly introduced into the suspension where the pH value was kept constant at pH 8.5. After the solution was completely added, the suspension was stirred for 1 h before adding a solution of 1.7 g of Dynasilan 6490 diluted with 14.7 g of isopropyl alcohol. After additional stirring for 180 minutes, suspension was filtered off and the filter cake was washed with demineralized water before drying at 75° C. under 100 mbar vacuum.

Example 12

100 g of commercially available silvery pearlescent pigment based on synthetic mica of fineness 10-50 μm (Symic C604, Eckart GmbH) was suspended in 900 g of water. Subsequently, the dispersion was heated to 70° C. and at a pH of 5.5 a solution consisting of 2.4 g $EuCl_3*H_2O$ dissolved in 75 mL Water was added. At the same time, the pH value was kept constant by adding a 10% KOH solution. Thereafter, the pH value was raised with 5 wt. % KOH solution to 7.5 and stirred for 15 min.

A water glass solution (51.4 g water glass solution, 6.0 wt. % $SiO_2$, mixed with 13.8 g of demineralized water) was then slowly introduced into the suspension where the pH value was kept constant at pH 7.5.

After the solution was completely added, the suspension was stirred for 1 h before adding a solution of 2.0 g of Dynasilan 1189 diluted with 24.3 g of isopropyl alcohol. After additional stirring for 180 minutes, suspension was filtered off and the filter cake was washed with demineralized water before drying at 95° C. under 100 mbar vacuum.

Example 13

100 g of commercially available silvery pearlescent pigment based on titanium dioxide coated synthetic mica of fineness 10-50 μm (Symic C001, Eckart GmbH) was suspended in 900 g of water. Subsequently, the dispersion was heated to 70° C. and at a pH of 5.5 a solution consisting of 2.2 g $Gd(NO_3)_3*6H_2O$ dissolved in 75 mL water was added. At the same time, the pH value was kept constant by adding a 10% KOH solution. Thereafter, the pH value was raised with 5 wt. % KOH solution to 7.5 and stirred for 15 min.

A water glass solution (11.4 g water glass solution, 6.0 wt. % $SiO_2$, mixed with 13.8 g of demineralized water) was then slowly introduced into the suspension where the pH value was kept constant at pH 7.5.

After the solution was completely added, the suspension was stirred for 1 h before adding a solution of 2.0 g of Dynasilan 1189 diluted with 24.3 g of isopropyl alcohol. After additional stirring for 180 minutes, suspension was filtered off and the filter cake was washed with demineralized water before drying at 95° C. under 100 mbar vacuum.

Example 14

150 g of commercially available silvery pearlescent pigment based synthetic mica of fineness 10-40 μm (Symic C604, Eckart GmbH) was suspended in 1200 g of water. Subsequently, the dispersion was heated to 70° C. and at a pH of 6.5 a solution consisting of 1.27 g $ZnCl_2$ dissolved in 60 mL Water was added. At the same time, the pH value was kept constant by adding a water glass solution (28.2 g water glass solution, 6.0 wt. % $SiO_2$, mixed with 31.0 g of demineralized water).

Subsequently, a solution consisting of 3.47 g $Sm(NO_3)_3*6H_2O$ dissolved in 67 mL Water was added. At the same time, the pH value was kept constant by adding a 10% KOH solution.

After the solution was completely added, the suspension was stirred for 1 h before adding a solution of 9.65 g of Hydrosil 2627 diluted with 36.5 g of demineralized water. After additional stirring for 180 minutes, suspension was filtered off and the filter cake was washed with demineralized water before drying at 95° C. under 100 mbar vacuum.

Example 15

100 g of commercially available silvery pearlescent pigment based on titanium dioxide and iron oxide coated synthetic mica of fineness 10-50 μm (Symic C604, Eckart GmbH) was suspended in 900 g of water. Subsequently, the dispersion was heated to 70° C. and at a pH of 5.5 a solution consisting of 2.4 g $EuCl_3*H_2O$ dissolved in 75 mL VE water was added. At the same time, the pH value was kept constant by adding a 10% KOH solution. Thereafter, the pH value was raised with 5 wt.-% KOH solution to 7.5 and stirred for 15 min. Than 12.0 g solution of Zinc chloride w ($ZnCl_2$) =7.0% was added by simultaneous adding water glass solution 8.5 wt.-% $SiO_2$, to keep pH at 7.5.

After the solution was completely added, the suspension was stirred for 90 minutes before slowly adding a solution of 6.43 g of Hydrosil 2627 diluted with 30 g of demineralized water. The suspension was kept stirring at 70° C. for further 17 h before it was filtered off and the filter cake has been washed with demineralized water before drying at 95° C. under 100 mbar vacuum.

Example 16

100 g of commercially available silvery pearlescent pigment based on titanium dioxide and iron oxide coated synthetic mica of fineness 10-50 μm (Symic C604, Eckart GmbH) was suspended in 900 g of water. Subsequently, the dispersion was heated to 70° C. before 12.0 g solution of Zinc chloride w (ZnCl$_2$)=7.0% was added. By continuous adding of water glass solution 8.5 wt.-% SiO$_2$, pH was adjusted to 7.0.

After the solution was completely added, the suspension was stirred for 1 h before pH was adjusted to 8.5. Afterwards a solution consisting of 3.06 g Sm(NO$_3$)$_3$*6H$_2$O dissolved in 67 mL VE water was added. At the same time, the pH value was kept constant by adding a 10% KOH solution. After the solution was completely added, the suspension was stirred for 1 h before adding a solution of 1.9 g of Dynasilan 6490 diluted with 10 g of isopropyl alcohol. After additional stirring for 180 minutes, suspension was filtered off and the filter cake was washed with demineralized water before drying at 95° C. under 100 mbar vacuum.

Example 17

100 g of commercially available pearlescent pigment with red interference based on titanium dioxide and coated synthetic mica of fineness 10-50 μm (Symic C241, Eckart GmbH) was suspended in 900 g of water. Subsequently, the dispersion was heated to 70° C. and pH adjusted to 7.5, before a solution consisting of 1.28 g Sm(NO$_3$)$_3$*6H$_2$O dissolved in 28 mL demineralized water was added. At the same time, the pH value was kept constant by adding a 10% KOH solution. After 15 min additional stirring 12.0 g solution of Zinc chloride w (ZnCl$_2$)=7.0% was added by simultaneous adding water glass solution 8.5 wt.-% SiO$_2$, to keep pH at 7.5. After the solution was completely added, the suspension was stirred for additional 90 minutes before slowly adding slowly adding a solution of 6.43 g of Hydrosil 2627 diluted with 30 g of demineralized water. The suspension was kept stirring at 70° C. for further 17 h before it was filtered off and filter cake has been washed with demineralized water before drying at 95° C. under 100 mbar vacuum.

Comparative Example 1: (in Accordance with EP 1682622 A1)

150 g of commercially available silvery pearlescent pigment based on synthetic mica of fineness 10-50 μm (Symic C604, Eckart GmbH) was suspended in 1200 g of water. Subsequently, the dispersion was heated to 70° C. and at a pH of 6.5 a solution consisting of 4.76 g CeNO$_3$*6H$_2$O dissolved in 60 mL water was added. At the same time, the pH value was kept constant by adding a 10% KOH solution. Thereafter, the pH value was raised with 5 wt. % KOH solution to 7.5 and stirred for 15 min.

A water glass solution (77.1 g water glass solution containing 6.0 wt. % SiO$_2$, mixed with 31.0 g of demineralized water) was then slowly introduced into the suspension where the pH value was kept constant at pH 7.5.

After the solution was completely added, the suspension was stirred for 1 h before adding a solution of 9.65 g of Hydrosil 2627 diluted with 36.5 g of demineralized water. After additional stirring for 180 minutes, suspension was filtered off and the filter cake was washed with demineralized water before drying at 95° C. under 100 mbar vacuum.

Comparative Example 2: (in Accordance with US 2014/018439 A1)

150 g of commercially available silver pearlescent pigment based on titanium dioxide coated synthetic mica of fineness 10-50 μm (Symic C001, Eckart GmbH) was suspended in 1200 g of water. Subsequently, the dispersion was heated to 70° C. and at a pH of 6.5 a solution consisting of 3.60 g CeNO$_3$*6H$_2$O dissolved in 60 mL water was added. At the same time, the pH value was kept constant by adding a 10% KOH solution. The dispersion was stirred for one further hour and then the pH value was raised to pH 7.5 by adding a 10% KOH solution. A solution of 5.7 g of Hydrosil 2776 diluted with 24.3 g of demineralized water was added. After additional stirring for 180 minutes, the suspension was filtered off and the filter cake was washed with demineralized water before drying at 95° C. under 100 mbar vacuum.

Comparative Example 3

Commercially available silver pearlescent pigment based on titanium dioxide coated synthetic mica of fineness 10-50 μm, Symic C001, Eckart GmbH ($D_{50}$ of 22 μm) without weather stable top coat.

Comparative Example 4

Commercially available silvery opaque pearlescent pigment with synthetic mica as substrate of fineness 10-50 μm, Symic C604, Eckart GmbH ($D_{50}$ of 22 μm) without weather stable top coat.

Comparative Example 5: (in Accordance with EP 1682622 A1)

150 g of commercially available silvery pearlescent pigment Symic C604, Eckart GmbH) was suspended in 1200 g of water. Subsequently, the dispersion was heated to 70° C. and at a pH of 6.5 a solution consisting of 1.19 g CeNO$_3$*6H$_2$O dissolved in 50 mL VE water was added. At the same time, the pH value was kept constant by adding a 10% KOH solution. Thereafter, the pH value was raised with 5 wt.-% KOH solution to 7.5 and stirred for 15 min.

A water glass solution (25.7 g water glass solution, 6.0 wt.-% SiO$_2$, mixed with 31.0 g of demineralized water) was then slowly introduced into the suspension where the pH value kept constant at pH 7.5.

After the solution was completely added, the suspension was stirred for 1 h before adding a solution of 2.25 g of Dynasilan 6490 diluted with 36.5 g of demineralized water. After additional stirring for 180 minutes, suspension was filtered off and the filter cake was washed with demineralized water before drying at 95° C. under 100 mbar vacuum.

Comparative Example 6

Commercially available red pearlescent pigment based on titanium dioxide coated glass flakes of fineness 10-60 μm, Luxan C241, Eckart GmbH ($D_{50}$ of 29 μm) without weather stable top coat.

In table 1 all experimental results regarding the composition of the top-layer are summarized.

TABLE 1

Experimental parameters and top coating composition of the samples

| Sample | Pearlescent pigment base | Composition inorganic metal oxides | 1st layer* | Weather stable top coating 2nd layer** | Type of organic modification | Amount of organic modification |
|---|---|---|---|---|---|---|
| Example 1 | SyMic C604 | $Eu_2O_3/SiO_2$ | 1.4% | 3.0% $SiO_2$ | HS2627 | 5.70% |
| Example 2 | SyMic C604 | $Pr_2O_3/SiO_2$ | 1.41 ($Pr_6O_{11}$) | 3.0% $SiO_2$ | HS2627 | 5.70% |
| Example 3 | SyMic C604 | $Sm_2O_3/SiO_2$ | 1.2 | 3.0% $SiO_2$ | HS2627 | 5.70% |
| Example 4 | SyMic C604 | $Gd_2O_3/SiO_2$ | 1.2 | 3.0% $SiO_2$ | HS2627 | 5.70% |
| Example 5 | SyMic C604 | $Yb_2O_3/SiO_2$ | 1.7 | 3.0% $SiO_2$ | HS2627 | 5.70% |
| Example 6 | SyMic C604 | $Nd_2O_3/SiO_2$ | 0.95 | 3.0% $SiO_2$ | HS2627 | 5.70% |
| Example 7 | SyMic C604 | $Eu_2O_3/SiO_2$ | 2.42 | 3.0% $SiO_2$ | Dynasilan 1189 | 2.1% |
| Example 8 | SyMic C604 | $Gd_2O_3/SiO_2$ | 1.5 | 2.5% $SiO_2$ | HS2627 | 5.70% |
| Example 9 | SyMic C604 | $Eu_2O_3/SiO_2$ | 1.6 | 2.5% $SiO_2$ | HS2627 | 5.70% |
| Example 10 | SyMic C604 | $Eu_2O_3/SiO_2$ | 2.8 | 2.5% $SiO_2$ | HS2776 | 5.70% |
| Example 11 | Luxan C241 | $Sm_2O_3/SiO_2$ | 1.3 | 2.5% $SiO_2$ | Dynasilan 6490 | 1.70% |
| Example 12 | SyMic C604 | $Eu_2O_3/SiO_2$ | 1.40 | 3.0% $SiO_2$ | Dynasilan 1189 | 2.00% |
| Example 13 | Symic C001 | $Gd_2O_3$ | 0.80 | — | Dynasilan 1189 | 2.00% |
| Example 14 | SyMic C604 | Co-coating $ZnO/SiO_2/Sm_2O_3$ | 0.44 | 1.13% $SiO_2$ + 0.45% ZnO*** | HS2627 | 5.70% |
| Example 15 | SyMic C604 | $Eu_2O_3/$ co-coating $ZnO/SiO_2$ | 0.9% | 0.5% $SiO_2/ZnO$ | HS2627 | 5.7% |
| Example 16 | SyMic C604 | Co-coating $ZnO/SiO_2/Sm_2O_3$ | 0.5% | 0.9% $Sm_2O_3$ | Dynasilan 6490 | 1.50% |
| Example 17 | SyMic C604 | $Sm_2O_3/$ Co-coating $ZnO/SiO_2$ | 0.5% | 1.0% $SiO_2/ZnO$ | HS2627 | 5.7% |
| Comp. Example 1 | SyMic C604 | $Ce_2O_3/SiO_2$ | 1.2% $Ce_2O_3$ | 3.0% $SiO_2$ | HS2627 | 5.70% |
| Comp. Example 2 | Symic C001 | $Ce_2O_3$ | 0.9% $Ce_2O_3$ | / | HS2776 | 5.70% |
| Comp. Example 3 | / | / | / | / | / | / |
| Comp. Example 4 | / | / | / | / | / | / |
| Comp. Example 5 | SyMic C604 | $Ce_2O_3/SiO_2$ | 0.3% $Ce_2O_3$ | 1.0% $SiO_2$ | Dynasilan 6490 | 1.50% |
| Comp. Example 6 | Luxan C241 | / | / | / | / | / |

*Measured with XRF and calculated in wt. % as $M_2O_3$, if not indicated otherwise
**Theoretical amount in wt. % related to amount of basic pearlescent pigment
***measured with XRF and calculated in wt. % as ZnO

B TESTING METHODS

Figure 1:
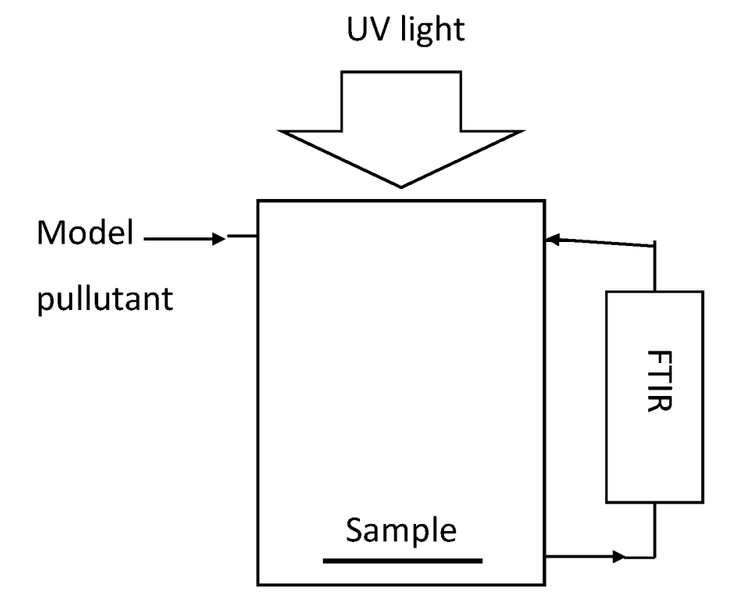

B1 Photocatalytic Activity:

In order to determine the photocatalytic activity of the pigment powders a special gas phase photoreactor was used, presented schematically in FIG. 1.

150 mg of pigment powder was weighted in the center of a petri dish which afterwards has been placed at the bottom of the photoreactor. The temperature of the photoreactor was adjusted and kept constant at 50° C.

The photoactivities of the samples were measured in ambient air which circulates by using a gas pump through a FTIR measurements system and back to the photoreactor. The initial water and $CO_2$ contents of the air were about 0.2% and 400 ppm, respectively.

As model pollutant 1 μL of acetone was injected over a septum inside the system. After the pollutant was homogeneously distributed the UV-lamp (90 mW/cm² at 405 nm) was switched on and acetone started to degrade forming $CO_2$ quantitatively.

The degradation of acetone and formation of $CO_2$ was monitored with a FTIR spectrometer as a function of time and fits to a 1st order reaction kinetics and 1st order rate constants were obtained. The initial formation rates of acetone and carbon dioxide are approximated linearly and the formation rates are obtained in ppm/h units.

The higher the $CO_2$ formation in ppm per hour, the higher the photocatalytic activity of the pigment powder is. The test was passed if the rate of $CO_2$ formation was less than 3 ppm/h.

For each test series a zero spectra needed to be imposed beforehand, by using same procedure without pigment and acetone injection. The values of this blind test were subtracted from the values of the samples with pigments.

B2: Color-Shade Constancy and Optical Properties of Sample Compared with the Starting Material without Top Coating:

The samples were applied as doctor-blade drawdowns on black-white opacity charts (Byko-Chart 2853, Byk Gardner) using a 40 µm spiral bar for samples based on synthetic mica and a 50 µm spiral bar for samples based on glass flakes. The effect pigments were dispersed in a conventional nitrocellulose coating (Dr. Renger Erco bronzing mixed varnish 2615e; from Morton, pigmentation of 6.0 wt.-% relative to the total weight of the wet varnish). In comparison to each sample without the weather stable top coating the change in color was determined using a MINOLTA CM-700d in diffuse reflection. The color values on the white parts of the opacity charts were measured and the differences were expressed with the well-known Hunter formula:

$$\Delta E^* = (\Delta L^{*2} + \Delta a^{*2} + \Delta b^{*2})^{1/2}$$

Such differences are characteristic for changes of the mass tone of the pearlescent pigment. An overall color change $\Delta E^*$ of ≤2.25 was acceptable.

B3 2-Coat Pneumatic Gun Application:

A white grounded aluminum test panel was painted with a 1K aqueous-based test base coat varnish comprising acrylate-polyurethane binder and pearlescent pigments of the examples and comparative examples in an amount of 1.5 wt. % using an Oerter APL1.2 spray gun application. The wet-thickness of the coatings were 13-17 µm and the coated panels were dried at 80° C. for 12 min.

A 1K conventional acrylate-based lacquer was used as clearcoat at a thickness of 37-43 µm and a drying temperature of 140° C. for 30 min. The use of a 1K clearcoat instead of the 2K clearcoat used conventionally enhances the testing conditions.

B4 Strengthened Weathering Test (Combined Xenon and Condensation Water Test):

The panels were subjected to Xenon accelerated weathering test according to SAE J 2527 for 1000 h. Directly afterwards the panels were subjected to a 72 h condensation water test according to DIN EN ISO 6270-2 at a temperate of 40° C.

The gloss was measured using a 20° gloss meter (micro-TRI-gloss of BYK Gardener GmbH) according to DIN EN ISO 2813 before and after the testing and expressed as difference in % relative to the gloss before testing. A decrease of the relative gloss of less than-40% was acceptable.

Occasionally, this test was only applied when the photocatalytic activity test and the color change tests were passed.

B5 Carbon Content Determination:

The carbon-content of all samples was determined by a combustion of the sample in an oxygen stream and detection of evolving $CO_2$ by IR spectroscopy using an analyzer of LECO instrument GmbH, Germany.

B6 XRF Analysis:

The metal oxide of the rare earth metals and the Zn-content of Example 14 of the samples and of some of the pigments from the comparative examples were determined by means of x-ray fluorescence analysis (XRF). For this purpose, the respective pigments were incorporated into a lithium tetraborate glass tablet, fixed in solid sample measuring cups and analyzed therefrom. The measuring instrument used was the Advantix ARL system from Thermo Scientific. The measurements were first calibrated with appropriate standard methods. The results are listed in table 1.

The Si-contents of the top coating of the samples could not be determined with this method, because the transparent synthetic mica or glass substrates already have a high amount of silica. Instead, the theoretical values assuming 100% reaction rates are depicted in table 1.

C RESULTS

The results of the testing are expressed in table 2.

TABLE 2

Test results of samples

| Sample | C-Content [wt. %] | Photoactivity $CO_2$ [ppm/h] | $\Delta E^*$ on white background | $\Delta$gloss 20° compared to untreated sample |
|---|---|---|---|---|
| Example 1 | 0.14% | <1 | 1.42 | −30.9 |
| Example 2 | 0.34% | <1 | 1.06 | −33.4 |
| Example 3 | 0.35% | <1 | 1.30 | −29.3 |
| Example 4 | 0.08% | <1 | 1.82 | −36.8 |
| Example 5 | 0.10% | <1 | 1.89 | −25.6 |
| Example 6 | 0.09% | <1 | 1.54 | −26.3 |
| Example 7 | <1 | 0.62 | 2.20 | −32.0 |
| Example 8 | 0.10% | <1 | 1.08 | −27.0 |
| Example 9 | <1 | 0.86 | 1.96 | −26.0 |
| Example 10 | 0.11% | <1 | 1.97 | −28.2 |
| Example 11 | 0.11% | <1 | 1.07 | −20.6 |
| Example 12 | 0.00 | <1 | 1.39 | −28.60 |
| Example 13 | 0.39% | 1 | 0.24 | −29.7 |
| Example 14 | 0.32% | <1 | 0.81 | −29.0 |
| Example 15 | 0.18% | <1 | 1.12 | −1.7 |
| Example 16 | 0.32% | <1 | 0.81 | −29.0 |
| Example 17 | 0.15% | <1 | 0.33 | −16.0 |
| Comp. Example 1 | 0.11% | <1 | 2.75 | −36.2 |
| Comp. Example 2 | — | 6 | 0.87 | −47.0 |
| Comp. Example 3 | — | 62 | — | −56.6 |
| Comp. Example 4 | — | 10 | — | −51.0 |
| Comp. Example 5 | — | 2 | — | −54.9 |
| Comp. Example 6 | — | 723 | — | −50.8 |

D DISCUSSION

All inventive Examples passed the photoactivity test very well, had a low change $\Delta E^*$ and passed the combined Xenon and condensation water test. The photoactivity test was tremendously failed by Comparative Example 7 which had no weather stable top coating at all and was a green pearlescent pigment. Also the Comparative Examples 3 and 4 representing silvery pearlescent pigments clearly failed this test.

Comparative Examples 1 and 5 were made according to EP 1682622 A1 and both Comparative Examples passed the photoactivity test. Comparative Example 1 also passed the combined Xenon and condensation water test while Comparative Example 5 did not pass this test. The Comparative Example 1, however, had a neutral anthracite color tone and did not pass the color change $\Delta E^*$ test, especially when compared with Examples 1 to 8 and Example 10. This can be attributed to the rather high amount of $Ce_2O_3$ used here and to the yellowish color of this cerium oxide. Comparative Example 5 passed the color change test ($\Delta E^*$ was comparable to Example 12 which had the same basic pearlescent pigment) which is apparently due to the low amount of $Ce_2O_3$ used. However, this amount of $Ce_2O_3$ seemed to be too low to pass the combined Xenon and condensation water test.

Example 13 represented a silvery pearlescent pigment which was coated only with a single metal oxide layer ($Gd_2O_3$) as rare earth metal in the top coating. This sample also passed all test although the photoactivity was slightly higher than most of the other Examples. In contrast, Comparative Example 2 had a single $Ce_2O_3$ top coating and did not pass the photoactivity test.

Examples 15 and 17 performed particularly well in the combined Xenon and condensation water test.

The carbon content of all Examples was rather low indicating that only a fraction of the silanes utilized for the surface modification was really bonded to the pigment's surface. Without being bonded to any theory the inventors believe that this rather low C-content effects in a surface which is not to hydrophobic which helps for passing the combined Xenon and condensation water test.

The invention claimed is:

1. Weather stable pearlescent pigment having a basic pearlescent pigment with an interference color which comprises a transparent platelet-shaped substrate and at least one metal oxide layer with a refractive index >1.8 and on top of this basic pearlescent pigment, a weather stabilizing top coating comprising at least one metal oxide and an organofunctional surface modification, wherein
   a) for a basic pearlescent pigment with silvery interference color, the weather stabilizing top coating comprises a first metal oxide of a rare earth metal $M^1$ from the group consisting of Y, Pr, Nd, Sm, Eu, Gd, Tb, Dy, Ho, Er, Tm, Yb, Lu and mixtures thereof, or
   b) for a basic pearlescent pigment with a colored interference color or a silvery interference color, the weather stabilizing top coating comprises a first metal oxide of a rare earth metal $M^1$ and a second metal oxide from a second metal $M^2$ wherein $M^1$ is selected from the group consisting of Y, Pr, Nd, Sm, Eu, Gd, Tb, Dy, Ho, Er, Tm, Yb, Lu and mixtures thereof, and $M^2$ is selected from the group consisting of Si, Al, Zn, Mg, Zr, Sn and mixtures or combinations thereof, and in each case a) or b) the organofunctional surface modification comprises organofunctional silanes or water-based pre-condensated organofunctional silanes.

2. Weather stable pearlescent pigment according to claim 1, wherein the weather stabilizing top coating comprises a metal oxide of a rare earth metal from the group consisting of Pr, Nd, Sm, Eu, Gd, Ho, Yb, and mixtures thereof.

3. Weather stable pearlescent pigment according to claims 1, wherein the weather stabilizing top coating comprises a metal oxide of a rare earth metal from the group consisting of Nd, Sm, Yb, Eu, Gd and mixtures thereof.

4. Weather stable pearlescent pigment according to claim 1, wherein the second metal oxide of metal M2 is selected from the group consisting of $SiO_2$, $Al_2O_3$, ZnO, MgO, $ZrO_2$, $SnO_2$ and mixtures or combinations thereof.

5. Weather stable pearlescent pigment according to claim 1, wherein 50 to 100 atomic-% of the rare earth metal $M^1$ metal oxide are based on a $M^1$(III) oxidation state, based on the total amount of $M^1$ ions.

6. Weather stable pearlescent pigment according to claim 1, wherein the amount of the first metal oxide of a rare earth metal $M^1$ is in a range of 0.3 to 3.0 wt. %, based on the total weight of the pearlescent pigment.

7. Weather stable pearlescent pigment according to claim 1, wherein the weather stabilizing top coating further comprises a cerium metal oxide in an amount of 0.0 to 30 wt %, calculated as $Ce_2O_3$ and referred to the total amount of rare earth weather stable top coating and calculated as $M^1{}_2O_3$.

8. Weather stable pearlescent pigment according to claim 1, wherein the amount of the second metal oxide of a metal $M^2$ is in a range of 1.0 to 4.0 wt. %, based on the total pearlescent pigment.

9. Weather stable pearlescent pigment according to claim 1, wherein the weather stabilizing top coating b) has a structure characterized that a first coating located on the high-index metal oxide coating is the first rare earth metal oxide coating which is followed by the second metal oxide coating.

10. Weather stable pearlescent pigment according to claim 1, wherein the weather stabilizing top coating b) has a structure characterized that the first rare earth metal oxide and the second metal oxide have been manufactured by co-precipitation of both metal oxide precursors.

11. Weather stable pearlescent pigment according to claim 1, wherein the transparent platelet-shaped substrate is selected from the group consisting of natural mica, synthetic mica platelets, glass platelets, $SiO_2$ platelets, $Al_2O_3$ platelets, synthetic boehmite platelets, BiOCl platelets and mixtures thereof.

12. A formulation comprising the weather stable pearlescent pigments of claim 1.

13. The formulation of claim 12 wherein the formulation is an automotive base coat formulation.

* * * * *